(12) United States Patent
Ikeno et al.

(10) Patent No.: US 7,649,597 B2
(45) Date of Patent: Jan. 19, 2010

(54) SEMI-TRANSMISSION TYPE LIQUID CRYSTAL DISPLAY WHICH REFLECTS INCIDENT LIGHT COMING FROM OUTSIDE TO PROVIDE A DISPLAY LIGHT SOURCE AND TRANSMITS LIGHT FROM A LIGHT SOURCE AT THE BACK

(75) Inventors: Hidenori Ikeno, Tokyo (JP); Masayoshi Suzuki, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 11/751,549

(22) Filed: May 21, 2007

(65) Prior Publication Data

US 2007/0211186 A1    Sep. 13, 2007

Related U.S. Application Data

(60) Continuation of application No. 11/236,905, filed on Sep. 28, 2005, now Pat. No. 7,369,200, which is a division of application No. 11/009,506, filed on Dec. 10, 2004, now abandoned, which is a continuation of application No. 10/216,967, filed on Aug. 12, 2002, now Pat. No. 6,831,715.

(30) Foreign Application Priority Data

Aug. 22, 2001    (JP) .............................. 2001-251088

(51) Int. Cl.
  *G02F 1/1335* (2006.01)
(52) U.S. Cl. .................. 349/114; 349/106; 349/113
(58) Field of Classification Search ................. 349/113, 349/114, 106
See application file for complete search history.

(56) References Cited

U.S. PATENT DOCUMENTS

| | | | |
|---|---|---|---|
| 6,195,140 B1 * | 2/2001 | Kubo et al. | 349/44 |
| 6,271,543 B1 | 8/2001 | Ohtani et al. | 257/72 |
| 6,452,654 B2 | 9/2002 | Kubo et al. | 349/114 |
| 6,476,889 B2 | 11/2002 | Urabe et al. | 349/106 |
| 6,563,554 B2 | 5/2003 | Okamoto et al. | 349/12 |

(Continued)

FOREIGN PATENT DOCUMENTS

JP           11-101992           4/1999

(Continued)

*Primary Examiner*—Julie-Huyen L Ngo
(74) *Attorney, Agent, or Firm*—Hayes Soloway P.C.

(57) ABSTRACT

A semi-transmission type liquid crystal display that maximizes the luminance in reflection mode and transmission mode. The liquid crystal display comprises a lower substrate with thin film transistors, an opposite substrate facing the lower substrate, a liquid crystal layer between the lower substrate and the opposite substrate, a reflection electrode formed in a reflection area of the lower substrate, a transparent electrode formed in a transparent area of the lower substrate, a common electrode formed on the opposite substrate, and a drive circuit for applying a voltage between the reflection electrode and the transparent electrode and the common electrode. The potential difference between a drive voltage applied to that surface of the lower substrate which contacts the liquid crystal layer and a drive voltage applied to that surface of the opposite substrate which contacts the liquid crystal layer is lower in the reflection area than in the transparent area.

20 Claims, 12 Drawing Sheets

U.S. PATENT DOCUMENTS

| | | | |
|---|---|---|---|
| 6,621,543 B2 | 9/2003 | Moon | 349/115 |
| 6,639,639 B2 * | 10/2003 | Baek et al. | 349/113 |
| 6,825,902 B2 * | 11/2004 | Kaneko | 349/114 |
| 6,825,904 B2 * | 11/2004 | Kamijyo | 349/122 |
| 6,853,421 B2 * | 2/2005 | Sakamoto et al. | 349/114 |
| 6,909,481 B2 | 6/2005 | Maeda et al. | 349/113 |
| 7,015,995 B2 * | 3/2006 | Ikeno et al. | 349/113 |
| 7,176,996 B2 * | 2/2007 | Rho | 349/114 |
| 2001/0022636 A1 | 9/2001 | Yang et al. | 349/55 |
| 2001/0048496 A1 * | 12/2001 | Baek | 349/114 |

FOREIGN PATENT DOCUMENTS

| | | |
|---|---|---|
| JP | 2000-193936 | 7/2000 |
| KR | 2001-0055636 | 7/2001 |

* cited by examiner

LIQUID CRYSTAL MOLECULES 16b 16c 16a 16d  15  14  22  23  15

16

17  20

19

21

18

31

SEMI-TRANSMISSION TYPE LIQUID CRYSTAL DISPLAY WHICH REFLECTS INCIDENT LIGHT COMING FROM OUTSIDE TO PROVIDE A DISPLAY LIGHT SOURCE AND TRANSMITS LIGHT FROM A LIGHT SOURCE AT THE BACK

CROSS REFERENCE TO RELATED APPLICATION

This application is a continuation of U.S. patent application Ser. No. 11/236,905, filed Sep. 28, 2005 now U.S. Pat. No. 7,369,200, which in turn is a divisional of U.S. patent application Ser. No. 11/009,506, filed Dec. 10, 2004, now abandoned, which in turn was a continuation of U.S. patent application Ser. No. 10/216,967 filed Aug. 12, 2002, now U.S. Pat. No. 6,831,715.

BACKGROUND OF THE INVENTION

1. Field of the Invention

The present invention relates to a liquid crystal display, and, more particularly, to a semi-transmission type liquid crystal display which reflects incident light coming from outside to provide a display light source and transmits light from a light source at the back.

2. Description of the Related Art

There is a reflection type liquid crystal display (LCD) known which has a reflector inside and reflects incident external light by the reflector to provide a display light source, thereby eliminating the need for a backlight as a light source and a transmission type liquid crystal display equipped with a backlight as a light source.

As the reflection type liquid crystal display can be designed with lower power consumption, thinner and lighter than the transmission type liquid crystal display, it is mainly used for a portable terminal. This is because as light input from outside is reflected at the reflector in the display, the light can be used as a display light source, thus eliminating the need for a backlight. The transmission type liquid crystal display has such a characteristic as having a better visibility than the reflection type liquid crystal display in case where ambient light is dark.

The basic structure of the existing liquid crystal displays comprises a liquid crystal of an TN (Twisted Nematic) type, a single sheet polarizer type, an STN (Super Twisted Nematic) type, a GH (Guest-Host) type, a PDLC (Polymer Dispersed Liquid Crystal) type, a cholesteric type or the like, a switching element which drives the liquid crystal and a reflector or backlight provided inside or outside a liquid crystal cell. Those ordinary liquid crystal displays employ an active matrix drive system which can achieve high definition and high image quality using thin film transistors (TFTs) or metal/insulating film/metal structure diodes (MIMS) as switching elements, and are equipped with a reflector or backlight.

As a liquid crystal display which has advantages of both the conventional reflection type liquid crystal display and transmission type liquid crystal display, a semi-transmission type liquid crystal display is disclosed (see Japanese Patent No. 2955277) which, as shown in FIG. 1, has gate interconnections 2 and source interconnections 3 so provided as to run around pixel electrodes 1 of an active matrix substrate and intersect each other perpendicularly, has thin film transistors 4 provided on the pixel electrodes 1, has the gate interconnections 2 and source interconnections 3 connected to the gate electrodes and source electrodes of the thin film transistors 4 and has reflection areas 5 of a metal film and transparent areas 6 of ITO formed in the pixel electrodes 1.

As the reflection areas and transparent areas are provided in the pixel electrodes, the backlight can be turned off when the ambient light is bright so that the liquid crystal display can be used as a reflection type liquid crystal display, and thus demonstrates lower power consumption that is the characteristic of the reflection type liquid crystal display. When the ambient light is dark, the backlight is turned on so that the liquid crystal display is used as a transmission type liquid crystal display, and thus demonstrates an improved visibility in case where ambient light is dark, which is the characteristic of the transmission type liquid crystal display. Hereunder, a liquid crystal display which can be used as a reflection type liquid crystal display and as a transmission type liquid crystal display will be called as a semi-transmission type liquid crystal display.

According to the conventional semi-transmission type liquid crystal display, however, incident light travels through the liquid crystal layer back and forth in the reflection area 5 and passes the liquid crystal layer in the transparent area 6, thus producing a difference in light path in the liquid crystal layer. This results in a retardation difference between both areas, which disables the maximization of the intensity of the output light. To solve the problem, the liquid crystal display described in Japanese Patent No. 2955277 has an insulating layer 8 provided under an transparent electrode 7 in the reflection area 5 and a reflector 9 arranged over or under the insulating layer 8, as illustrated in a cross-sectional view of a liquid crystal display shown in FIG. 2, thereby providing a difference between the thickness, dr, of the liquid crystal layer in the reflection area 5 and the thickness, df, of the liquid crystal layer in the transparent area 6.

FIG. 5 is a graph showing the results of computing the intensity, Ip, of the output light in transmission mode and the intensity, Iλ, of the output light in reflection mode. It is apparent that the intensities of the output light in transmission mode and in reflection mode differ depending on the thickness of the liquid crystal layer. The difference in light path between the reflection area 5 and the transparent area 6 is canceled to approximate the characteristic of the output light by setting the ratio of the thickness dr of the liquid crystal layer in the reflection area to the thickness dr of the liquid crystal layer in the transparent area to about 1:2. Because the thickness of the insulating layer 8 is about a half the thickness of the liquid crystal layer and should be several micrometers, the number of the fabrication processes is increased, thus impairing the planarization of the transparent electrode 7. An alignment film which is formed on the transparent electrode 7 in order to align the liquid crystal molecules is affected by the planarization of the transparent electrode 7. This brings about a problem of making effective alignment difficult in a rubbing process.

Further, as shown in FIG. 3, a step between the reflection area 5 and the transparent area 6 disturbs an electric line of force 10 produced between a lower substrate 11 and an opposite substrate 12, thus deteriorating the characteristics of the liquid crystal display. Furthermore, as shown in FIG. 4, in a liquid crystal layer 13 around the step portion between the reflection area 5 and transparent area 6 on the lower substrate 11, the relationship between the direction of alignment of the liquid crystal molecules and the pretilt angle of the liquid crystal molecules in the vicinity of the surface of the lower substrate 11 generates disturbance in the rotational direction of the liquid crystal molecules (reverse tilt disclination) at the time the liquid crystal display is operated, thus deteriorating the characteristics of the liquid crystal display.

SUMMARY OF THE INVENTION

Accordingly, it is an object of the invention to provide a semi-transmission type liquid crystal display which maximizes the luminance in reflection mode as well as transmission mode, so that the alignment of liquid crystal molecules is not disturbed even around the boundary between the reflection area and the transparent area.

A liquid crystal display according to the invention comprises:

a lower substrate on which interconnections and thin film transistors are formed;

an opposite substrate so arranged as to face the lower substrate;

a liquid crystal layer sandwiched between the lower substrate and the opposite substrate;

a reflection electrode formed in a reflection area of the lower substrate;

a transparent electrode formed in a transparent area of the lower substrate;

a common electrode formed on the opposite substrate; and a drive circuit for applying a voltage between the reflection electrode and the transparent electrode and the common electrode, whereby a potential difference between a drive voltage applied to that surface of the lower substrate which contacts the liquid crystal layer and a drive voltage applied to that surface of the opposite substrate which contacts the liquid crystal layer is made lower in the reflection area than in the transparent area.

As the drive voltage applied to the liquid crystal layer in the reflection area is lower than the drive voltage applied to the liquid crystal layer in the transparent area, the birefringence of the liquid crystal layer in the reflection area becomes smaller than the birefringence of the liquid crystal layer in the transparent area, making it possible to ensure the optimal birefringence in each of the reflection mode and transmission mode. This can optimize the intensities of the output light in both modes.

The liquid crystal display may be constructed in such a way that the potential difference between the drive voltage applied to that surface of the lower substrate which contacts the liquid crystal layer and the drive voltage applied to that surface of the opposite substrate which contacts the liquid crystal layer is made lower in the reflection area than in the transparent area by capacitive division of an electrostatic capacity of the reflection area.

The capacitive division of the electrostatic capacity of the reflection area produces a difference between the drive voltages of the transparent area and reflection area, so that the transparent area and reflection area can be simultaneously driven by the different voltages using a voltage that is supplied by a single thin film transistor. This makes it possible to prevent an increase in the quantity of the thin film transistors and eliminate the complexity of the drive voltage control, leading to a reduction in the production cost of the liquid crystal display.

The liquid crystal display may be constructed in such a way that a cell gap which is a thickness of a liquid crystal layer in the transparent area is substantially equal to a cell gap which is a thickness of a liquid crystal layer in the reflection area.

As the cell gaps in the transparent area and the reflection area are substantially identical, it is possible to eliminate an alignment disturbance produced by the disturbance of the electric line of force in the liquid crystal layer or an alignment disturbance, such as the reverse tilt disclination produced by the disturbance of the pretilt angle. This can improve the characteristics of the liquid crystal display.

The liquid crystal display may be constructed in such a way that an insulating layer is deposited on the thin film transistors, the reflection electrode and the transparent electrode are formed on the insulating layer at predetermined regions, the transparent electrode is electrically connected to a source electrode of each of the thin film transistors via a contact hole formed in the insulating layer, and the opposite substrate is connected to the transparent electrode via an insulating film.

The connection of the reflection electrode to the transparent electrode via the insulating film allows a capacitor to be formed by the reflection electrode and transparent electrode and a potential difference can be produced between the transparent area and reflection area by capacitively dividing the capacitor formed by the liquid crystal sandwiched between the transparent electrode and the opposite electrode into a capacitor formed by the transparent electrode-insulating film-reflection electrode and a capacitor formed by the reflection electrode-liquid crystal-opposite electrode.

The liquid crystal display may be constructed in such a way that an insulating layer is deposited on the thin film transistors, the reflection electrode and the transparent electrode are formed on the insulating layer at predetermined regions, the transparent electrode is electrically connected to a source electrode of each of the thin film transistors via a contact hole formed in the insulating layer, the opposite substrate is electrically connected to the transparent electrode and an insulating film is deposited on that surface of the opposite substrate which contacts the liquid crystal layer.

As the insulating film is deposited on the reflection electrode, a capacitor formed by the liquid crystal sandwiched between the reflection electrode and the opposite electrode is capacitatively divided into a capacitor formed by the insulating film and a capacitor formed by the liquid crystal, thereby providing a potential difference between the transparent area and the reflection area.

The liquid crystal display may be constructed in such a way that an insulating layer is deposited on the thin film transistors, the reflection electrode and the transparent electrode are formed on the insulating layer at predetermined regions, the transparent electrode is electrically connected to a source electrode of each of the thin film transistors via a contact hole formed in the insulating layer, the opposite substrate is electrically connected to the transparent electrode and an insulating film is deposited on that region of the opposite substrate which faces the reflection electrode.

As the insulating film is deposited on that region of the opposite substrate which faces the reflection electrode, a capacitor formed by the liquid crystal sandwiched between the reflection electrode and the opposite electrode is capacitatively divided into a capacitor formed by the liquid crystal and a capacitor formed by the insulating film, thereby providing a potential difference between the transparent area and the reflection area.

The liquid crystal display may be constructed in such a way that an insulating layer is deposited on the thin film transistors, the reflection electrode and the transparent electrode are formed on the insulating layer at predetermined regions, the transparent electrode is electrically connected to a source electrode of each of the thin film transistors via a contact hole formed in the insulating layer, the opposite substrate is electrically connected to the transparent electrode and an insulating film is deposited on the reflection electrode and that region of the opposite substrate which faces the reflection electrode.

As the insulating film is deposited on the reflection electrode and that region of the opposite substrate which faces the reflection electrode, a capacitor formed by the liquid crystal sandwiched between the reflection electrode and the opposite electrode is capacitatively divided into a capacitor formed by the insulating film and a capacitor formed by the liquid crystal, thereby providing a potential difference between the transparent area and the reflection area.

The liquid crystal display may be constructed in such a way that an insulating layer is deposited on the thin film transistors, the reflection electrode and the transparent electrode are formed on the insulating layer at predetermined regions, the transparent electrode is electrically connected to a source electrode of each of the thin film transistors via a contact hole formed in the insulating layer, a second source electrode is connected to the source electrode via an insulating film, and the reflection electrode is electrically connected to the second source electrode via a contact hole formed in the insulating layer.

As the second source electrode is connected to the source electrode via the insulating film, a capacitor is formed by the reflection electrode and the transparent electrode. By capacitatively dividing a capacitor formed by the liquid crystal sandwiched between the transparent electrode and the opposite electrode into a capacitor formed by the transparent electrode-insulating film-second source electrode and a capacitor formed by the reflection electrode-liquid crystal-opposite electrode, a potential difference can be provided between the transparent area and the reflection area.

The liquid crystal display may be constructed in such a way that an insulating layer is deposited on the thin film transistors, the transparent electrode is formed on the insulating layer, an insulating film is deposited on the transparent electrode, the reflection electrode is formed the insulating film, the transparent electrode is electrically connected to a source electrode of each of the thin film transistors via a contact hole formed in the insulating layer, and openings are formed in the reflection electrode and the insulating film to the transparent electrode.

As the insulating film is formed on the transparent electrode and the reflection electrode is formed on the insulating film, a capacitor is formed by the reflection electrode and the transparent electrode. By capacitatively dividing a capacitor formed by the liquid crystal sandwiched between the transparent electrode and the opposite electrode into a capacitor formed by the transparent electrode-insulating film-reflection electrode and a capacitor formed by the reflection electrode-liquid crystal-opposite electrode, a potential difference can be provided between the transparent area and the reflection area. Because the reflection electrode and insulating film are eliminated at the opening, the opening serves as the transparent area.

The liquid crystal display may be constructed in such a way that undulations are formed on the insulating layer and the openings are formed in top peripheral regions of the undulations and/or bottom peripheral regions thereof.

It is difficult to efficiently reflect light input from the opposite substrate toward a viewer in the top peripheral regions and the bottom peripheral regions of the undulations. Therefore, the openings are formed in the top peripheral regions and the bottom peripheral regions as transparent areas, so that efficient liquid crystal display can be ensured in reflection mode as well as transmission mode.

The insulating film may be formed of one selected from SiN, $SiO_2$, $Ti_2O_3$, $Ta_2O_5$, SiO, $Al_2O_3$, acryl and arton.

Because SiN, $SiO_2$, $Ti_2O_3$, $Ta_2O_5$, SiO, $Al_2O_3$, acryl and arton can be used as the material for the insulating film, it is possible to select the optimal insulating film in accordance with various conditions, such as the usage, the product quality and the material for the liquid crystal. This increases the degree of freedom in the design stage.

The liquid crystal display may be constructed in such a way that a first color filter is formed on the opposite substrate, a second color filter is formed on the thin film transistors and the reflection electrode is formed on the second color filter.

As color filters are formed on the opposite substrate and the device substrate, light passes the color filter on the opposite substrate side twice in reflection mode and light passes the color filters on the device substrate and the opposite substrate once each in transmission mode. This can make it possible to reduce a change in color in both modes. It is also possible to respectively set the hues in transmission mode and reflection mode.

DETAILED DESCRIPTION OF THE PREFERRED EMBODIMENTS

One embodiment of the invention will be described below with reference to the accompanying drawings. The embodiment is just one form of the invention and does not restrict the invention.

Figure 6:
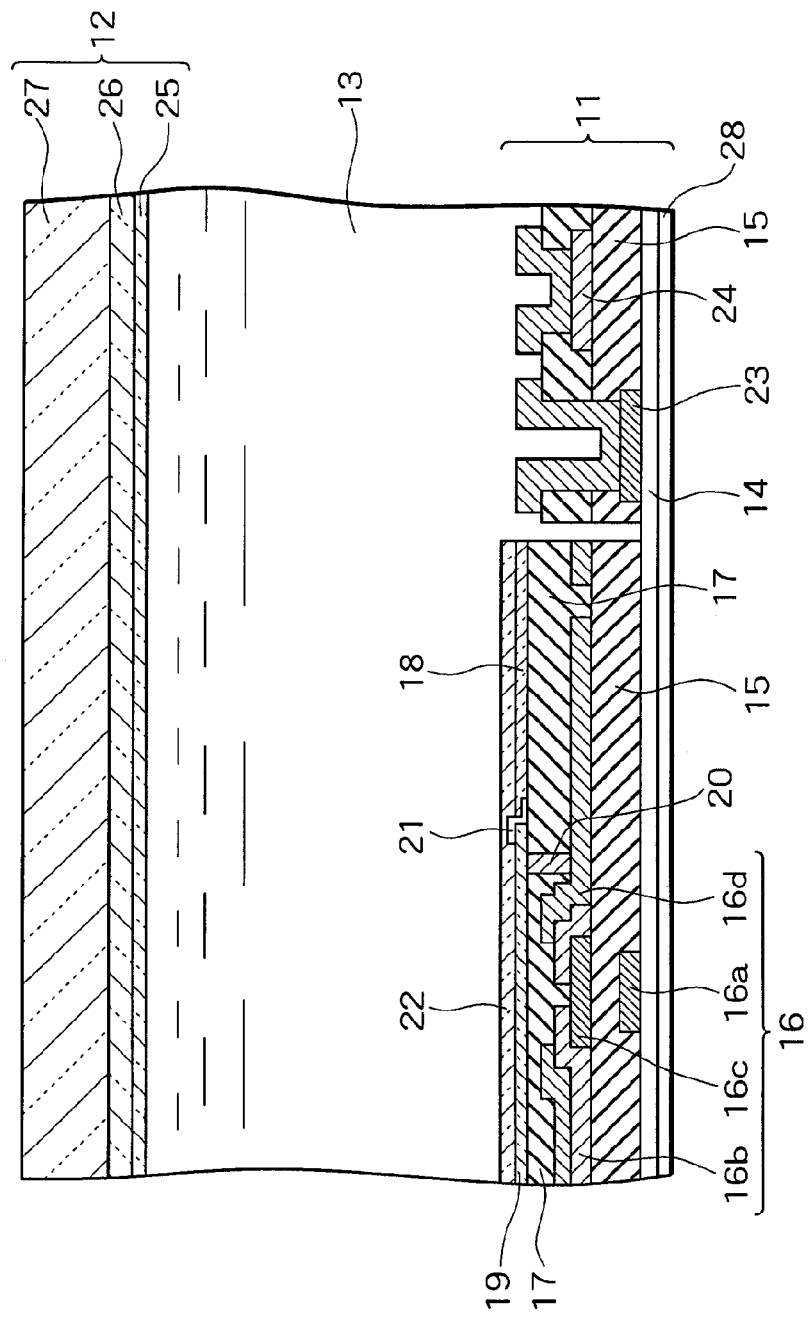
FIG. 6 is a partial cross-sectional view of a semi-transmission type liquid crystal display according to a first embodiment.

FIG. 6 is a partial cross-sectional view of a semi-transmission type liquid crystal display according to the first embodiment of the invention. As shown in FIG. 6, the semi-transmission type liquid crystal display has, inside, a lower substrate 11, an opposite substrate 12 so arranged as to face the lower substrate 11 and a liquid crystal layer 13 sandwiched between the lower substrate 11 and the opposite substrate 12. The semi-transmission type liquid crystal display employs an active matrix system which has, for example, thin film transistors (TFTs) provided as switching elements pixel by pixel.

Figure 1:
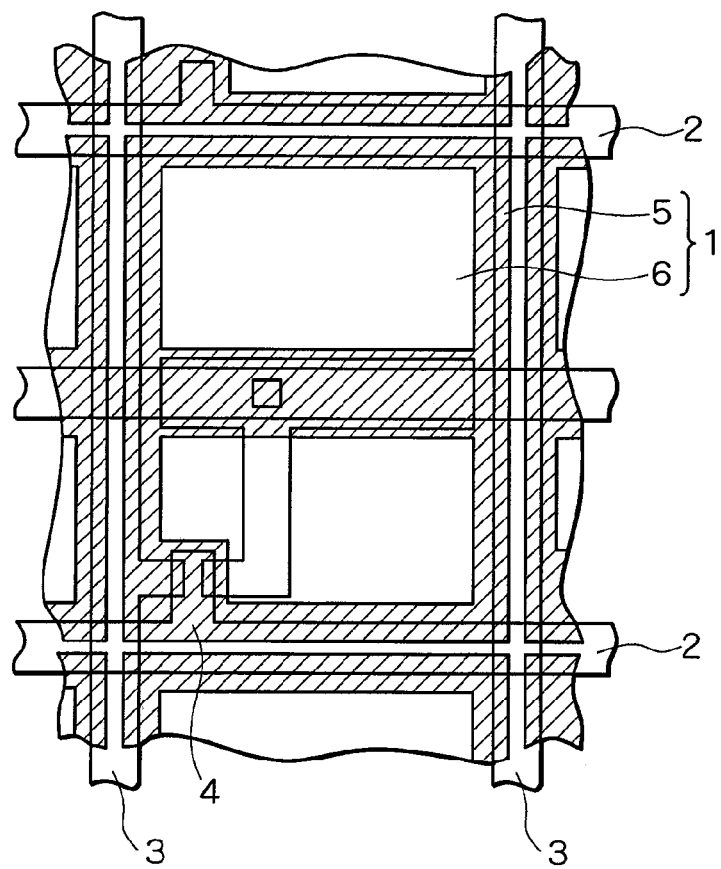
FIG. 1 is a plan view of a conventional semi-transmission type liquid crystal display.
Figure 2:
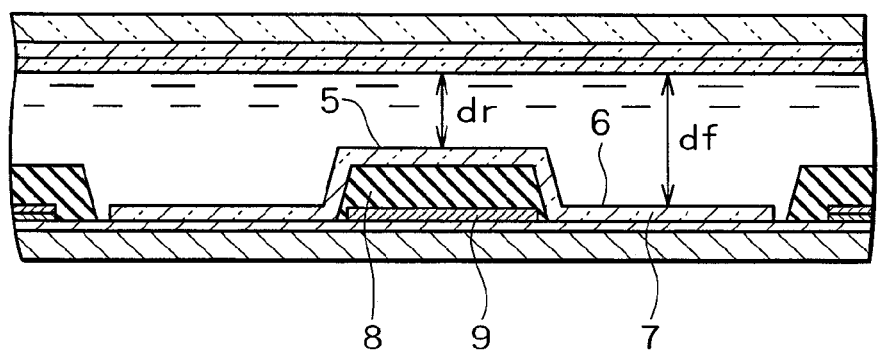
FIG. 2 is a cross-sectional view of the conventional semi-transmission type liquid crystal display.
Figure 3:
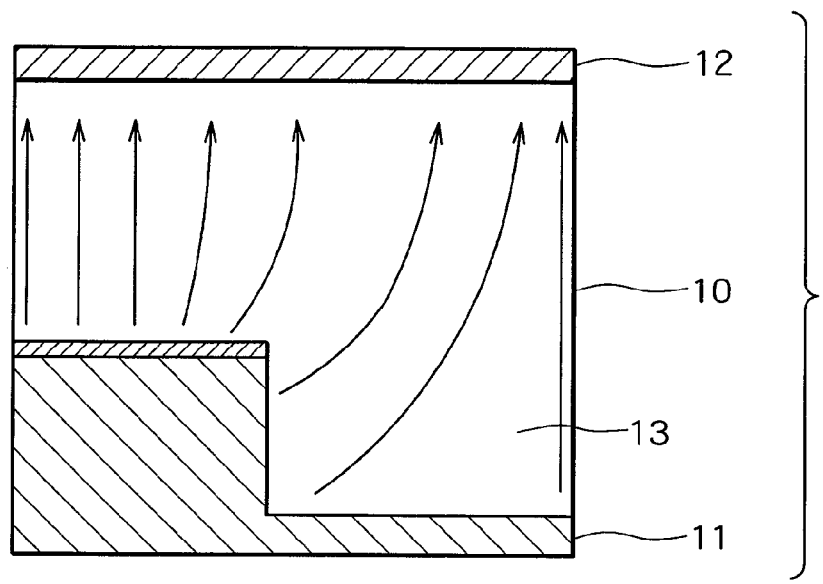
FIG. 3 is a diagram showing the disturbance of the electric line of force in the conventional semi-transmission type liquid crystal display.
Figure 4:
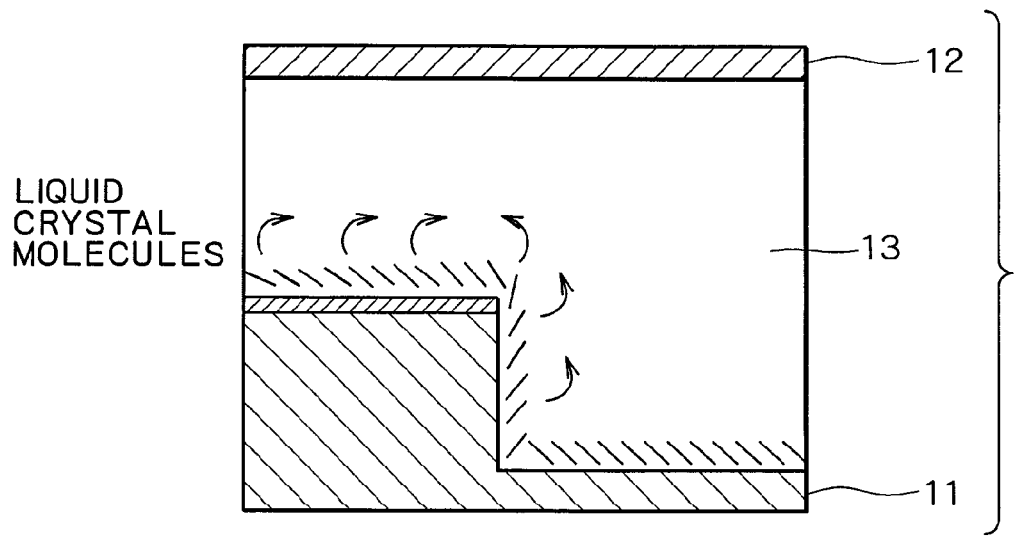
FIG. 4 is a diagram showing the disturbance of the rotational direction of liquid crystal molecules in the conventional semi-transmission type liquid crystal display.
Figure 5:
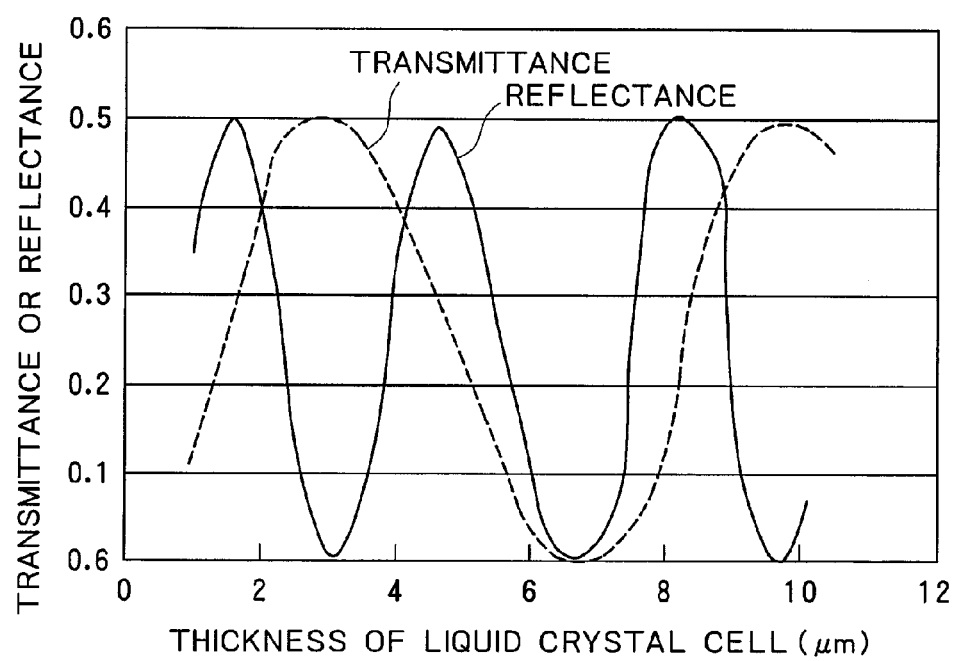
FIG. 5 is a graph showing the relationship between the thickness of the liquid crystal layer and the intensity of output light in reflection mode and transmission mode.

The lower substrate 11 has an insulative substrate 14, an insulating protection film 15, TFTs 16, an insulating layer 17, a reflection electrode 18 and a transparent electrode 19. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a. The planar arrangement of the drain electrode 16b and source electrode 16d is reverse to that of the prior art shown in FIG. 1. The reason why the illustration of the prior art differs from that of the invention is that the names, "drain" and "source", used in the prior art are reverse to those used in the invention.

A contact hole 20 reaching the source electrode 16d of the TFT 16 is bored in the insulating layer 17. The reflection electrode 18 and transparent electrode 19 are deposited, covering the contact hole 20 and the insulating layer 17. The transparent electrode 19 is connected to the source electrode 16d of the TFT 16 and has a function to serve as a pixel electrode. The reflection electrode 18 is electrically connected to the transparent electrode 19 via an insulating film 21 and has a function to serve as a reflector and a pixel electrode.

An alignment film 22 of polyimide or the like which aligns the liquid crystal molecules is deposited, covering the reflection electrode 18 and transparent electrode 19. As the alignment film 22 is rubbed, the alignment direction of the liquid crystal molecules of the liquid crystal layer 13 is determined. That surface of the opposite substrate 12 which contacts the liquid crystal layer 13 is also covered with an alignment film (not shown). A gate terminal portion 23 on the insulative substrate 14 and a drain terminal portion 24 on the insulating protection film 15 covering the gate terminal portion 23 are formed in a terminal area provided in the peripheral portion of the lower substrate 11.

The opposite substrate 12 has a transparent electrode 25, a color filter 26 and an insulative substrate 27 laminated in order from that side of the liquid crystal layer 13. Incident light input to the opposite substrate 12 from the insulative substrate 27 travels from the opposite substrate 12 and reaches the lower substrate 11 through the liquid crystal layer 13, and is reflected at the reflection electrode 18 to become reflected light. The reflected light travels through the liquid crystal layer 13 again and comes out of the opposite substrate 12 from the transparent electrode 25.

A backlight 28 is provided opposite side of the lower substrate 11 to the liquid crystal layer 13. The light from the backlight 28 reaches the liquid crystal layer 13, passing through the insulative substrate 14, the insulating protection film 15, the insulating layer 17 and the transparent electrode 19 and comes out of the opposite substrate 12 from the transparent electrode 25 through the liquid crystal layer 13.

Figure 7:
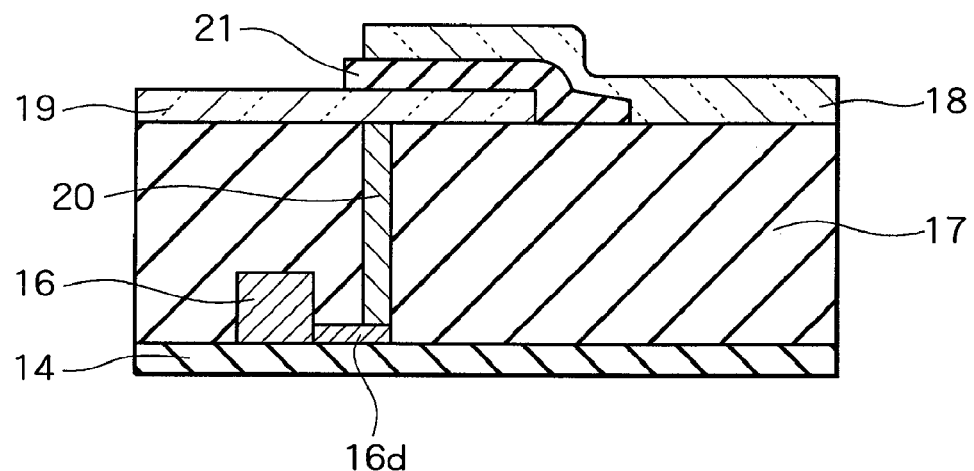
FIG. 7 is a cross-sectional view showing a part of a lower substrate of the first embodiment in a simplified form.

FIG. 7 is a cross-sectional view showing a part of the lower substrate 11 of the liquid crystal display shown in the cross-sectional view of FIG. 6. As the transparent electrode 19 is electrically connected to the source electrode 16d of the TFT 16 via the contact hole 20, the potential supplied by the TFT 16 equals the potential of the transparent electrode 19. As the reflection electrode 18 is connected to the transparent electrode 19 via the insulating film 21, however, the potential of the reflection electrode 18 becomes lower than the potential of the transparent electrode 19. At this time, a capacitor is formed by the reflection electrode 18, the transparent electrode 19 and the insulating film 21.

Figure 8:
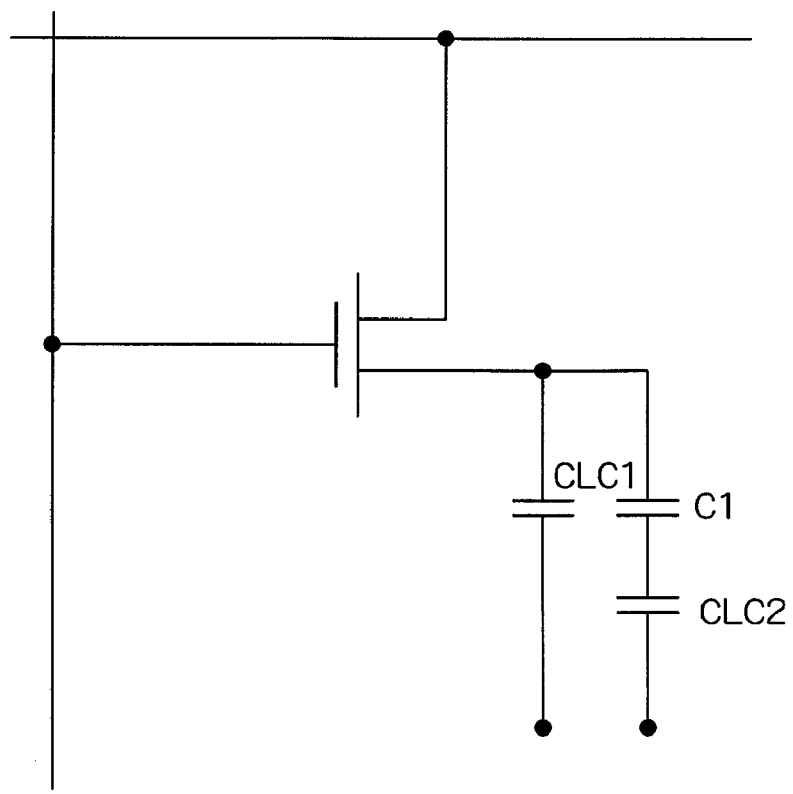
FIG. 8 is an equivalent circuit of what is illustrated in FIGS. 6 and 7.

FIG. 8 is an equivalent circuit of the liquid crystal display illustrated in FIGS. 6 and 7. Provided that the structure of sandwiching the liquid crystal layer 13 between the lower substrate 11 and the opposite substrate 12 is regarded as a capacitor, let CLC1 be the combination of the transparent electrode 19 and the opposite substrate 12, let CLC2 be the combination of the reflection electrode 18 and the opposite substrate 12, and let C1 be the reflection electrode 18 and transparent electrode 19 connected together via the insulating film 21. Because two capacitors, CLC2 and C1, are connected in series in the area of the reflection electrode 18, the voltage applied by the TFT 16 is capacitively divided so that the voltage applied to the liquid crystal layer 13 becomes lower than the voltage applied only to the CLC1 in the area of the transparent electrode 19.

It is known that in case where quarter-wave plates are provided on the upper and lower substrates to produce a phase difference of $\lambda/4$ in such a way that the plates pass opposite circularly polarized lights, for example, the liquid crystal which has initially taken the vertical alignment state goes into a so-called normally black mode of providing black display in both the reflection portion and transmission portion when no voltage is applied, but if the wavelength of light used for display is set to $\lambda$, the reflection type liquid crystal display provides output light with the highest intensity when the birefringence (retardation) of the liquid crystal layer 13 is $\lambda/4$ while the transmission type liquid crystal display provides output light with the highest intensity when the birefringence is $\lambda/2$. It is also known that as the voltage applied to the liquid crystal layer 13 is increased, the birefringence of the liquid crystal layer 13 is increased monotonously.

It is therefore possible to optimize the birefringence of the liquid crystal layer 13 in both the transmission mode and reflection mode by connecting the reflection electrode 18 and the transparent electrode 19 via the insulating film 21 to provide the equivalent circuit shown in FIG. 8, which produces a potential difference between the reflection electrode 18 and the transparent electrode 19. Available materials for the insulating film 21 are SiN, $SiO_2$, $Ti_2O_3$, $Ta_2O_5$, SiG, $Al_2O_3$, and the like. Because the capacitances of the CLC1 and CLC2 in FIG. 8 change according to the material for, and the thickness of, the liquid crystal layer 13 and the relationship between the applied voltage and the birefringence also varies depending on the material for the liquid crystal layer 13, however, it is necessary to adequately adjust the material for the thickness of the insulating film 21.

FIGS. 9A through 9F are explanatory diagrams showing a fabrication process for the lower substrate in the process of manufacturing the semi-transmission type liquid crystal display shown in FIG. 6. As shown in FIG. 7, first, the gate electrode 16a is formed on the insulative substrate 14, the insulating protection film 15 is deposited on the gate electrode 16a and the drain electrode 16b, the semiconductor layer 16c and the source electrode 16d are formed on the insulating protection film 15, thereby forming the substrate of the TFT 16 as a switching element (see FIG. 9A). Further, the insulating layer 17 is deposited covering the TFT 16 and the contact hole 20 reaching the source electrode 16d is formed (see FIG. 9B). The switching element is not limited to the TFT 16 but a substrate for other switching elements, such as a diode, may be prepared as well.

Figure 9A:
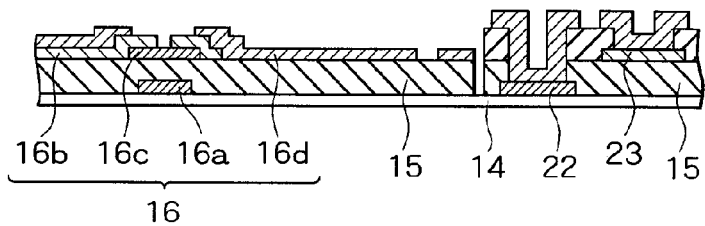
FIGS. 9A through 9F are diagrams showing a fabrication process for the lower substrate of the first embodiment.
Figure 9B:
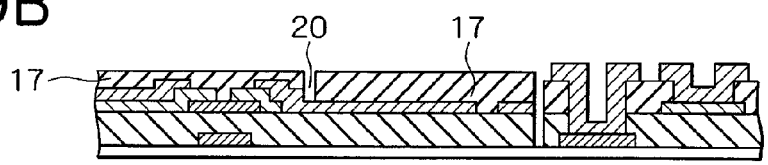
Figure 9C:
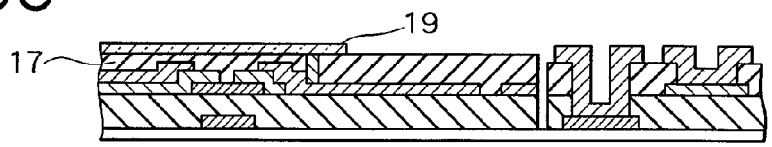
Figure 9D:
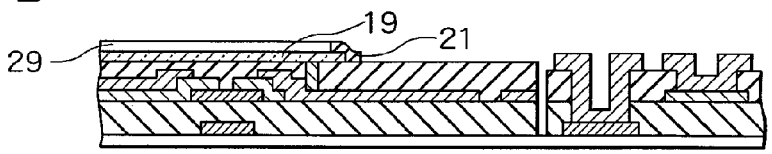

Next, the transparent electrode 19 is formed of ITO, covering the insulating layer 17 so that the source electrode 16d and the transparent electrode 19 have an electrical contact with each other via the contact hole 20 (see FIG. 9C). At the time the transparent electrode 19 is deposited, ITO can be deposited selectively only in the transparent area by using sputtering with masking applied. With a mask 29 applied on the transparent electrode 19 to expose only the boundary region with the reflection area, the insulating film 21 is formed by anodization (see FIG. 9D).

Figure 9E:
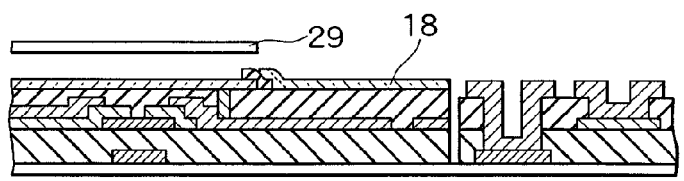
Figure 9F:
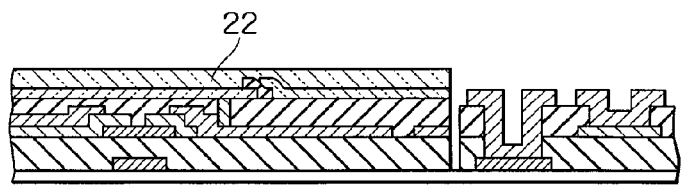

Then, with the mask 29 applied to the transparent electrode 19 and the insulating film 21, the reflection electrode 18 or an Al film is formed on the insulating layer 17 by vacuum deposition (see FIG. 9E). The material for the reflection electrode 18 is not limited to Al but other conductive materials may be used as well. Next, the alignment film 22 of polyimide is coated on the reflection electrode 18, the transparent electrode 19 and the insulating film 21 and is rubbed in the direction of the intended alignment of the liquid crystal (see FIG. 9F). As the lower substrate 11 is fabricated in the above-described manner and is made to face, via a frame member, the opposite substrate 12 on which the color filter 26 and the transparent electrode 25 are deposited, and the liquid crystal layer 13 is injected between both substrates to thereby manufacture the liquid crystal display. As that surface of the lower substrate 11 which contacts the liquid crystal layer 13 can be made substantially planarized, the alignment disturbance or the like of the liquid crystal layer 13 does not occur in the vicinity of the boundary between the transparent area and the reflection area.

The second embodiment of the invention will be discussed below. As in the first embodiment in FIG. 6, the lower substrate 11 has an insulative substrate 14, an insulating protection film 15 (not shown), TFTS 16, an insulating layer 17, a reflection electrode 18 and a transparent electrode 19. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a. A gate terminal portion 23 on the insulative substrate 14 and a drain terminal portion 24 on the insulating protection film 15 covering the gate terminal portion 23 are formed in a terminal area provided in the peripheral portion of the lower substrate 11.

Figure 10:
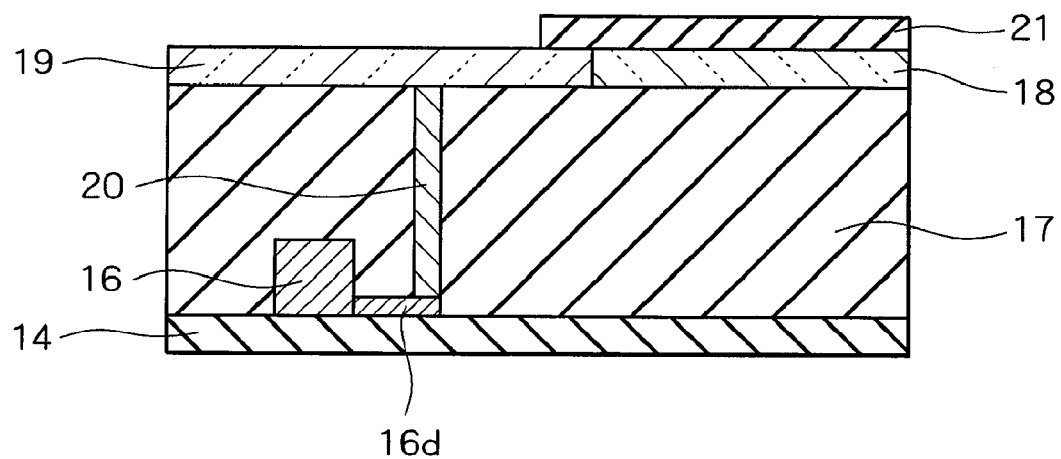
FIG. 10 is a cross-sectional view showing a part of a lower substrate of a second embodiment in a simplified form.

FIG. 10 is a cross-sectional view showing a part of the lower substrate of the second embodiment in a simplified form. A contact hole 20 reaching the source electrode 16d of the TFT 16 is bored in the insulating layer 17. The reflection electrode 18 and transparent electrode 19 are deposited, covering the contact hole 20 and the insulating layer 17. The transparent electrode 19 is connected to the source electrode 16d of the TFT 16 and has a function to serve as a pixel electrode. The reflection electrode 18 is electrically connected to the transparent electrode 19 via an insulating film 21 and has a function to serve as a reflector and a pixel electrode. The transparent insulating film 21 of SiO2 or the like is deposited on the reflection electrode 18. At this time, the insulating film 21 is deposited on the entire surface of the reflection electrode 18 in such a way as to completely cover the reflection electrode 18. Although not illustrated, an alignment film 22 of polyimide or the like which aligns the liquid crystal molecules is deposited, covering the reflection electrode 18 and transparent electrode 19. As the alignment film 22 is rubbed, the alignment direction of the liquid crystal molecules of the liquid crystal layer 13 is determined.

As the transparent electrode 19 is electrically connected to the source electrode 16d of the TFT 16 via the contact hole 20, the potential supplied by the TFT 16 equals the potential of the transparent electrode 19. As the reflection electrode 18 is connected to the transparent electrode 19 directly and electrically, the potential of the reflection electrode 18 becomes equal to the potential of the transparent electrode 19. Because the transparent insulating film 21 is deposited on the reflection electrode 18, that surface of the reflection area which contacts the liquid crystal layer 13 becomes the top surface of the insulating film 21 so that a capacitor is formed by the top surface of the insulating film 21 and the reflection electrode 18.

An equivalent circuit of the liquid crystal display according to the second embodiment becomes the one shown in FIG. 8, as per the first embodiment. Provided that the structure of sandwiching the liquid crystal layer 13 between the lower substrate 11 and the opposite substrate 12 is regarded as a capacitor, let CLC1 be the combination of the transparent electrode 19 and the opposite substrate 12, let C1 be the combination of the reflection electrode 18 and the top surface of the insulating film 21, and let CLC2 be the combination of the top surface of the insulating film 21 and the opposite substrate 12. Because two capacitors, CLC2 and C1, are connected in series in the area of the reflection electrode 18, the voltage applied by the TFT 16 is capacitively divided so that the voltage applied to the liquid crystal layer 13 becomes lower than the voltage applied only to the CLC1 in the area of the transparent electrode 19.

It is known that with λ being the wavelength of light used for display, the reflection type liquid crystal display provides output light with the highest intensity when the birefringence (retardation) of the liquid crystal layer 13 is λ/4 while the transmission type liquid crystal display provides output light with the highest intensity when the birefringence is λ/2. It is also known that as the voltage applied to the liquid crystal layer 13 is increased, the birefringence of the liquid crystal layer 13 is increased monotonously. It is therefore possible to optimize the birefringence of the liquid crystal layer 13 in both the transmission mode and reflection mode by depositing the insulating film 21 on the reflection electrode 18 so as to provide the equivalent circuit shown in FIG. 8, which produces a potential difference between the reflection electrode 18 and the transparent electrode 19. Available materials for the insulating film 21 are organic materials, such as SiN, $SiO_2$, acryl and arton. Because the capacitances of the CLC1 ad CLC2 in FIG. 8 change according to the material for, and the thickness of, the liquid crystal layer 13 and the relationship between the applied voltage and the birefringence also varies depending on the material for the liquid crystal layer 13, however, it is necessary to adequately adjust the material for and the thickness of the insulating film 21.

FIGS. 11A through 11E are explanatory diagrams showing a fabrication process for the lower substrate in the process of manufacturing the semi-transmission type liquid crystal display shown in FIG. 10. First, the gate electrode 16a is formed on the insulative substrate 14, the insulating protection film 15 is deposited on the gate electrode 16a and the drain electrode 16b, the semiconductor layer 16c and the source electrode 16d are formed on the insulating protection film 15, thereby forming the substrate of the TFT 16 as a switching element (see FIG. 11A). Further, the insulating layer 17 is deposited covering the TFT 16 and the contact hole 20 reaching the source electrode 16d is formed (see FIG. 11B). The switching element is not limited to the TFT 16 but a substrate for other switching elements, such as a diode, may be prepared as well.

Figure 11A:
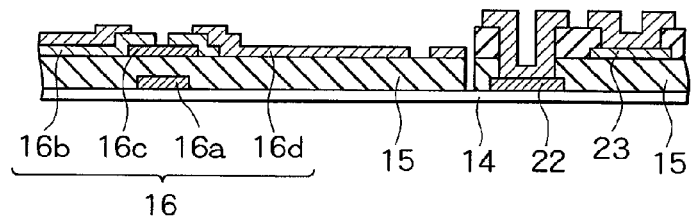
FIGS. 11A through 11E are diagrams showing a fabrication process for the lower substrate of the second embodiment.
Figure 11B:
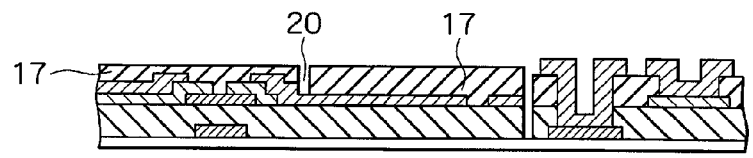
Figure 11C:
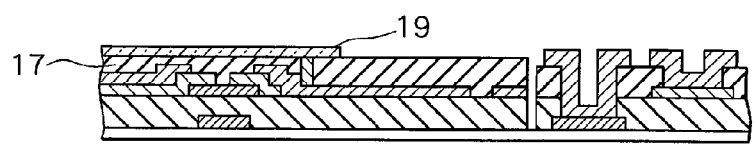
Figure 11D:
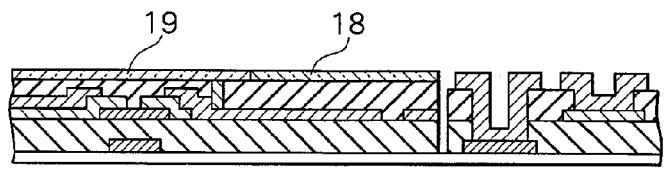
Figure 11E:
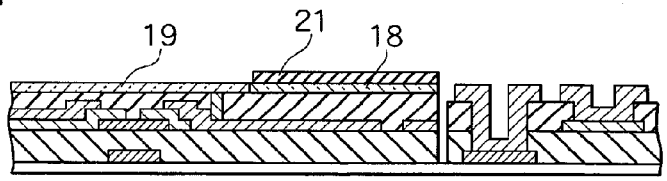

Next, the transparent electrode 19 is formed of ITO, covering the insulating layer 17 so that the source electrode 16d and the transparent electrode 19 have an electrical contact with each other via the contact hole 20 (see FIG. 11C). At the time the transparent electrode 19 is deposited, ITO can be deposited selectively only in the transparent area by using sputtering with masking applied. With masking applied on the transparent electrode 19, the reflection electrode 18 is formed by sputtering or the like (see FIG. 11D). Then, with the masking applied to the transparent electrode 19, $SiO_2$ is deposited on the reflection electrode 18 by CVD, thereby forming the insulating film 21 (see FIG. 11E). Next, the alignment film 22 of polyimide is coated on the reflection electrode 18, the transparent electrode 19 and the insulating film 21 and is rubbed in the direction of the intended alignment of the liquid crystal (not shown). The insulating film 21 may be deposited on that area of the opposite substrate 12 which faces the reflection electrode 18. Alternatively, the insulating film 21 may be deposited on both the reflection electrode 18 and that area of the opposite substrate 12 which faces the reflection electrode 18.

The material for the reflection electrode 18 is not limited to Al but other conductive materials may be used as well. As the lower substrate 11 is fabricated in the above-described manner and is made to face, via a frame member, the opposite substrate 12 on which the color filter 26 and the transparent electrode 25 are deposited, and the liquid crystal layer 13 is injected between both substrates to thereby manufacture the liquid crystal display. As that surface of the lower substrate 11 which contacts the liquid crystal layer 13 can be made substantially planarized, the alignment disturbance or the like of the liquid crystal layer 13 does not occur in the vicinity of the boundary between the transparent area and the reflection area.

The third embodiment of the invention will be discussed below. As in the first embodiment in FIG. 6, the lower substrate 11 has an insulative substrate 14, an insulating protection film 15 (not shown), TFTs 16, an insulating layer 17, a reflection electrode 18 and a transparent electrode 19. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c, a source electrode 16d and a second source electrode 30, the last four electrodes lying on the insulating protection film 15 covering the gate electrode 16a. A gate terminal portion 23 on the insulative substrate 14 and a drain terminal portion 24 on the insulating protection film 15 covering the gate terminal portion 23 are formed in a terminal area provided in the peripheral portion of the lower substrate 11.

Figure 12:
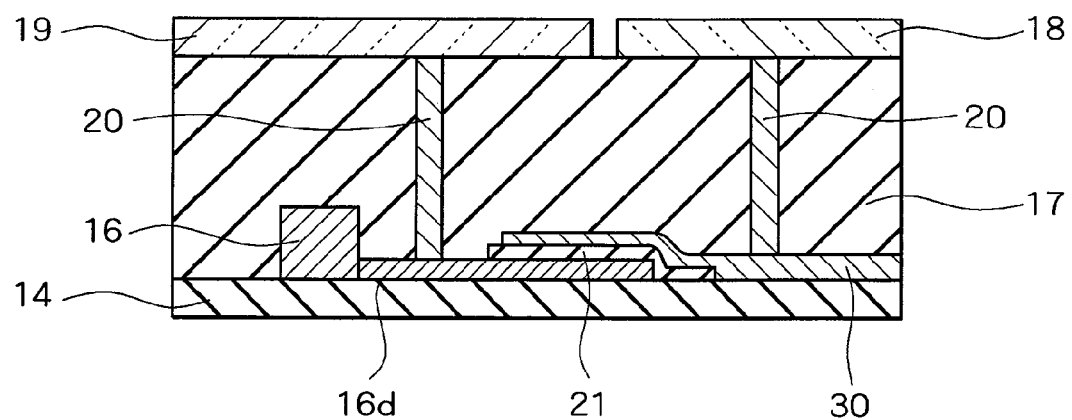
FIG. 12 is a cross-sectional view showing a part of a lower substrate of a third first embodiment in a simplified form.

FIG. 12 is a cross-sectional view showing a part of the lower substrate of the second embodiment in a simplified form. The source electrode 16d and the second source electrode 30 are connected together via an insulating film 21 of SiO2. A contact hole 20 reaching the source electrode 16d of the TFT 16 and a contact hole 20 reaching the second source electrode 30 are bored in the insulating layer 17. The reflection electrode 18 and transparent electrode 19 are deposited, covering the contact hole 20 and the insulating layer 17. The transparent electrode 19 is connected to the source electrode 16d or the drain electrode 16b of the TFT 16 and has a function to serve as a pixel electrode. The reflection electrode 18 is connected to the second source electrode 30 and has a function to serve as a reflector and a pixel electrode. The reflection electrode 18 and the transparent electrode 19 are not directly and electrically connected together. Although not illustrated, an alignment film 22 of polyimide or the like which aligns the liquid crystal molecules is deposited, covering the reflection electrode 18 and transparent electrode 19.

As the alignment film 22 is rubbed, the alignment direction of the liquid crystal molecules of the liquid crystal layer 13 is determined.

As the transparent electrode 19 is electrically connected to the source electrode 16d of the TFT 16 via the contact hole 20, the potential supplied by the TFT 16 equals the potential of the transparent electrode 19. As the reflection electrode 18 is connected via the insulating film 21 to the TFT 16 and the second source electrode 30, the potential of the reflection electrode 18 becomes lower than the potential of the transparent electrode 19. At this time, a capacitor is formed by the reflection electrode 18, the transparent electrode 19 and the insulating film 21.

An equivalent circuit of the liquid crystal display according to the third embodiment becomes the one shown in FIG. 8, as per the first and second embodiments. Provided that the structure of sandwiching the liquid crystal layer 13 between the lower substrate 11 and the opposite substrate 12 is regarded as a capacitor, let CLC1 be the combination of the transparent electrode 19 and the opposite substrate 12, let CLC2 be the combination of the reflection electrode 18 and the opposite substrate 12, and let C1 be the reflection electrode 18 and the second source electrode 30 connected to the source electrode 16d via the insulating film 21. Because two capacitors, CLC2 and C1, are connected in series in the area of the reflection electrode 18, the voltage applied by the TFT 16 is capacitively divided so that the voltage applied to the liquid crystal layer 13 becomes lower than the voltage applied only to the CLC1 in the area of the transparent electrode 19.

It is known that with λ being the wavelength of light used for display, the reflection type liquid crystal display provides output light with the highest intensity when the birefringence (retardation) of the liquid crystal layer 13 is λ/4 while the transmission type liquid crystal display provides output light with the highest intensity when the birefringence is λ/2. It is also known that as the voltage applied to the liquid crystal layer 13 is increased, the birefringence of the liquid crystal layer 13 is increased monotonously. It is therefore possible to optimize the birefringence of the liquid crystal layer 13 in both the transmission mode and reflection mode by intervening the insulating film 21 between the source electrode 16d and the second source electrode 30 so as to provide the equivalent circuit shown in FIG. 8, which produces a potential difference between the reflection electrode 18 and the transparent electrode 19. Available materials for the insulating film 21 are SiN, $SiO_2$, $Ti_2O_3$, $Ta_2O_5$, SiO, $Al_2O_3$, and the like. Because the capacitances of the CLC1 and CLC2 in FIG. 8 change according to the material for, and the thickness of, the liquid crystal layer 13 and the relationship between the applied voltage and the birefringence also varies depending on the material for the liquid crystal layer 13, however, it is necessary to adequately adjust the material for and the thickness of the insulating film 21.

FIGS. 13A through 13F are explanatory diagrams showing a fabrication process for the lower substrate in the process of manufacturing the semi-transmission type liquid crystal display shown in FIG. 12. First, the gate electrode 16a is formed on the insulative substrate 14, the insulating protection film 15 is deposited on the gate electrode 16a and the drain electrode 16b, the semiconductor layer 16c and the source electrode 16d are formed on the insulating protection film 15, thereby forming the substrate of the TFT 16 as a switching element (see FIG. 13A). The switching element is not limited to the TFT 16 but a substrate for other switching elements, such as a diode, may be prepared as well. With a mask 29 applied on the insulating protection film 15 and TFT 16 to expose only the end portion of the source electrode 16d, the insulating film 21 is formed by anodization (see FIG. 13B).

Figure 13A:
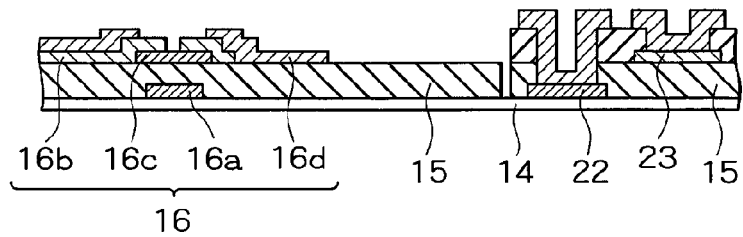
FIGS. 13A through 13F are diagrams showing a fabrication process for the lower substrate of the third embodiment.
Figure 13B:
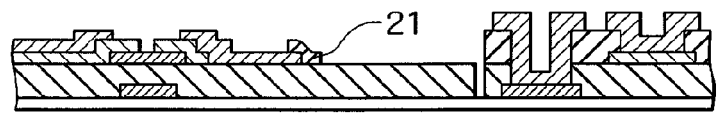
Figure 13C:
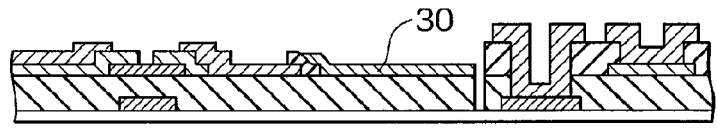
Figure 13D:
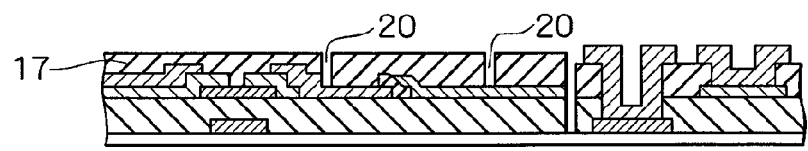
Figure 13E:
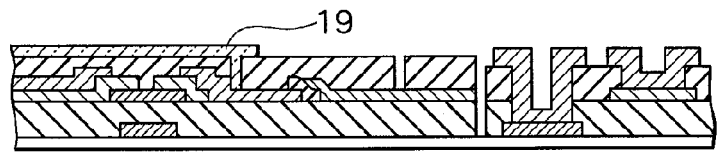
Figure 13F:
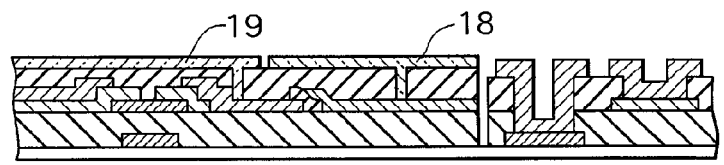

Next, the second source electrode 30 is patterned on the insulating protection film 15 at a predetermined position in such a way as to be connected to the source electrode 16d via the insulating film 21 (see FIG. 13C). Further, the insulating layer 17 is deposited covering the TFT 16 and the contact hole 20 reaching the source electrode 16d and the contact hole 20 reaching the second source electrode 30 are formed in the insulating layer 17 (see FIG. 13D). Next, the transparent electrode 19 of ITO is deposited over the insulating layer 17 so as to electrically contact the source electrode 16d via the contact hole 20. At the time the transparent electrode 19 is deposited, ITO can be deposited selectively only in the transparent area by using sputtering with masking applied (see FIG. 13E).

Thereafter, the reflection electrode 18 of Al is formed on and over the insulating layer 17 so as to electrically contact the second source electrode 30 via the contact hole 20. At the time the reflection electrode 18 is deposited, the Al film can be formed selectively only in the reflection area by vacuum deposition with masking applied (see FIG. 13F). The material for the reflection electrode 18 is not limited to Al, but other conductive materials can be used as well. Next, the alignment film 22 of polyimide is coated on the reflection electrode 18, the transparent electrode 19 and the insulating film 21 and is rubbed in the direction of the intended alignment of the liquid crystal (not shown).

As the lower substrate 11 is fabricated in the above-described manner and is made to face, via a frame member, the opposite substrate 12 on which the color filter 26 and the transparent electrode 25 are deposited, and the liquid crystal layer 13 is injected between both substrates to thereby manufacture the liquid crystal display. As that surface of the lower substrate 11 which contacts the liquid crystal layer 13 can be made substantially planarized, the alignment disturbance or the like of the liquid crystal layer 13 does not occur in the vicinity of the boundary between the transparent area and the reflection area.

A further embodiment of the invention will be discussed below. As in the first embodiment in FIG. 6, the lower substrate 11 has an insulative substrate 14, an insulating protection film 15 (not shown), TFTs 16, an insulating layer 17, a reflection electrode 18 and a transparent electrode 19. The insulating protection film 15 is deposited on the insulative substrate 14 and the TFTs 16 are formed on the insulating protection film 15. Each TFT 16 has a gate electrode 16a on the insulative substrate 14, a drain electrode 16b, a semiconductor layer 16c and a source electrode 16d, the last three electrodes lying on the insulating protection film 15 covering the gate electrode 16a. A gate terminal portion 23 on the insulative substrate 14 and a drain terminal portion 24 on the insulating protection film 15 covering the gate terminal portion 23 are formed in a terminal area provided in the peripheral portion of the lower substrate 11.

Figure 14:
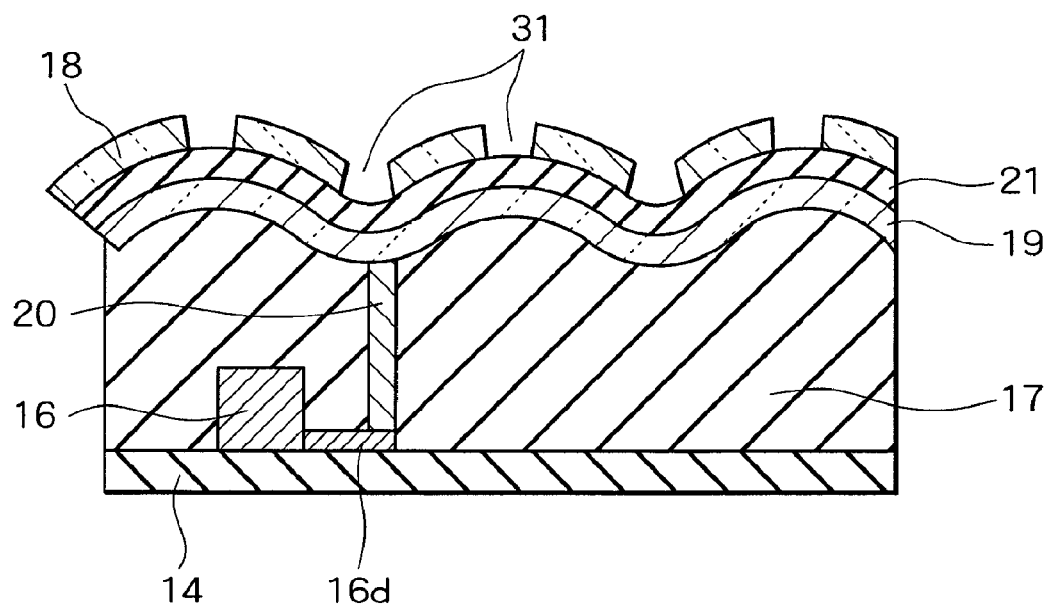
FIG. 14 is a cross-sectional view showing a part of a lower substrate of a fourth embodiment in a simplified form.

FIG. 14 is a cross-sectional view showing a part of the lower substrate of the fourth embodiment in a simplified form. A contact hole 20 reaching the source electrode 16d of the TFT 16 is bored in the insulating layer 17. The transparent electrode 19, the insulating film 21 and the reflection electrode 18 are deposited, covering the contact hole 20 and the insulating layer 17. The transparent electrode 19 is connected to the source electrode 16d of the TFT 16 and has a function to serve as a pixel electrode. The transparent insulating film 21 of SiO2 or the like is deposited between the transparent electrode 19 and the reflection electrode 18. The reflection electrode 18 is electrically connected to the transparent electrode 19 via an insulating film 21 and has a function to serve as a reflector and a pixel electrode.

The insulating layer 17 has an undulating surface and the transparent electrode 19 and the reflection electrode 18 deposited on the insulating layer 17 also have undulating surfaces. The reflection electrode 18 and the insulating film 21 are removed in the top region and bottom region of the undulating surface of the reflection electrode 18, and opening 31 are formed in such a way that the transparent electrode 19 contacts the liquid crystal layer 13.

Although not illustrated, an alignment film 22 of polyimide or the like which aligns the liquid crystal molecules is deposited, covering the reflection electrode 18 and transparent electrode 19. As the alignment film 22 is rubbed, the alignment direction of the liquid crystal molecules of the liquid crystal layer 13 is determined. As the transparent electrode 19 is electrically connected to the source electrode 16d of the TFT 16 via the contact hole 20, the potential supplied by the TFT 16 equals the potential of the transparent electrode 19. As the reflection electrode 18 is connected to the transparent electrode 19 via the insulating film 21, however, the potential of the reflection electrode 18 becomes lower than the potential of the transparent electrode 19. At this time, a capacitor is formed by the reflection electrode 18, the transparent electrode 19 and the insulating film 21.

An equivalent circuit of the liquid crystal display according to the fourth embodiment becomes the one shown in FIG. 8, as per the first to third embodiments. Provided that the structure of sandwiching the liquid crystal layer 13 between the lower substrate 11 and the opposite substrate 12 is regarded as a capacitor, let CLC1 be the combination of the transparent electrode 19 and the opposite substrate 12 at the associated opening 31, let CLC2 be the combination of the reflection electrode 18 and the opposite substrate 12, and let C1 be the reflection electrode 18 and transparent electrode 19 connected together via the insulating film 21. Because two capacitors, CLC2 and C1, are connected in series in the area of the reflection electrode 18, the voltage applied by the TFT 16 is capacitively divided so that the voltage applied to the liquid crystal layer 13 becomes lower than the voltage applied only to the CLC1 in the area of the transparent electrode 19.

It is known that with λ being the wavelength of light used for display, the reflection type liquid crystal display provides output light with the highest intensity when the birefringence (retardation) of the liquid crystal layer 13 is λ/4 while the transmission type liquid crystal display provides output light with the highest intensity when the birefringence is λ/2. It is also known that as the voltage applied to the liquid crystal layer 13 is increased, the birefringence of the liquid crystal layer 13 is increased monotonously. It is therefore possible to optimize the birefringence of the liquid crystal layer 13 in both the transmission mode and reflection mode by depositing the insulating film 21 on the reflection electrode 18 so as to provide the equivalent circuit shown in FIG. 8, which produces a potential difference between the reflection electrode 18 and the transparent electrode 19. Available materials for the insulating film 21 are organic materials, such as SiN, SiO$_2$, acryl and arton. Because the capacitances of the CLC1 ad CLC2 in FIG. 8 change according to the material for, and the thickness of, the liquid crystal layer 13 and the relationship between the applied voltage and the birefringence also varies depending on the material for the liquid crystal layer 13, however, it is necessary to adequately adjust the material for and the thickness of the insulating film 21.

FIGS. 15A through 15F are explanatory diagrams showing a fabrication process for the lower substrate in the process of manufacturing the semi-transmission type liquid crystal display shown in FIG. 14. First, the gate electrode 16a is formed on the insulative substrate 14, the insulating protection film 15 is deposited on the gate electrode 16a and the drain electrode 16b, the semiconductor layer 16c and the source electrode 16d are formed on the insulating protection film 15, thereby forming the substrate of the TFT 16 as a switching element (see FIG. 15A). The switching element is not limited to the TFT 16 but a substrate for other switching elements, such as a diode, may be prepared as well.

Further, the insulating layer 17 is deposited over the TFT 16. To form an undulating surface on the insulating layer 17, the insulating layer 17 is formed flat after which with the insulating layer 17 masked, steps are formed on the insulating layer 17 using a photoresist. Thereafter, annealing is performed to make the corner portions of the steps of the insulating layer 17 round, so that the insulating layer 17 formed has gentle undulations on the surface. The contact hole 20 reaching the source electrode 16d is formed in the insulating layer 17 (see FIG. 15B). Next, the transparent electrode 19 is formed of ITO over the insulating layer 17 by sputtering, so that the source electrode 16d and the transparent electrode 19 electrically contact each other via the contact hole 20 (see FIG. 15C). Further, the insulating film 21 of $SiO_2$ is deposited on the transparent electrode 19 by CVD (see FIG. 15D). Then, the reflection electrode 18 which is an Al film is formed on the insulating film 21 by vacuum deposition (see FIG. 15E).

Figure 15A:
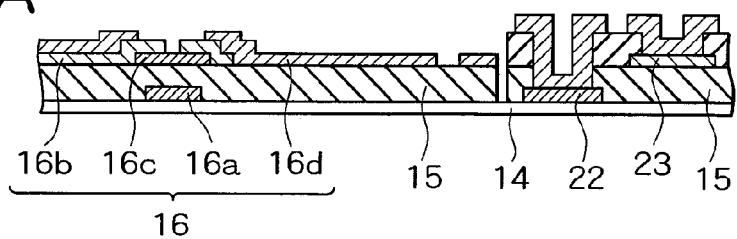
FIGS. 15A through 15F are diagrams showing a fabrication process for the lower substrate of the fourth embodiment.
Figure 15B:
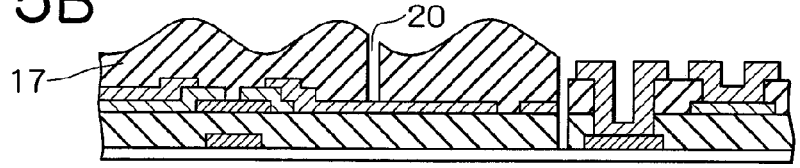
Figure 15C:
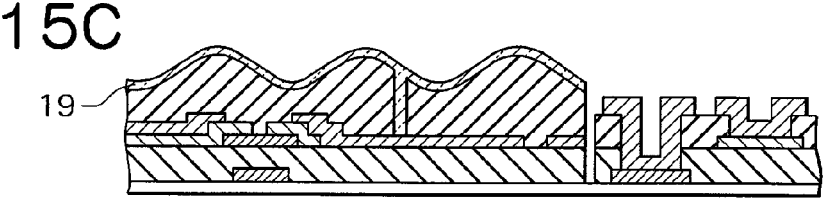
Figure 15D:
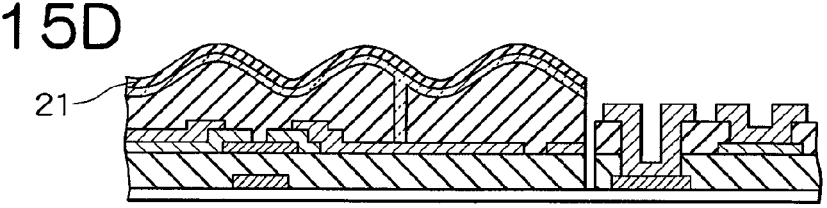
Figure 15E:
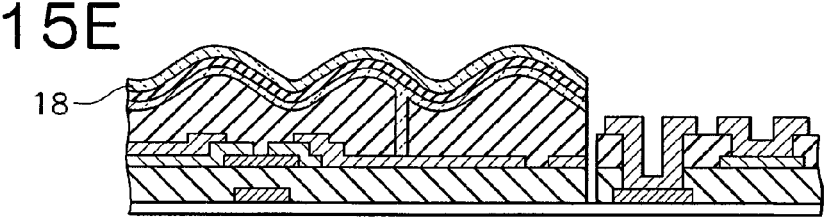
Figure 15F:
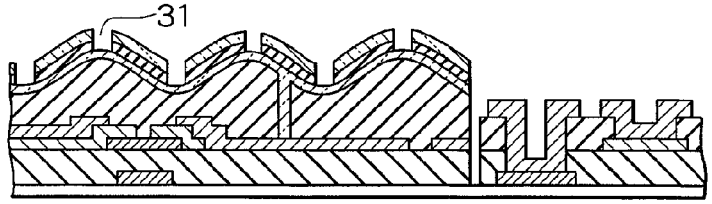

Based on the mask that has been used to form the undulations in the process in FIG. 15B, the top regions and bottom regions of the undulating surface of the reflection electrode 18 are specified, and with a mask having holes at the positions corresponding to the top regions and bottom regions, the reflection electrode 18 and the transparent electrode 19 at the top regions and bottom regions are removed using etching and a photoresist, thereby forming the openings 31. In each opening 31, the transparent electrode 19 is exposed (see FIG. 15F).

The material for the reflection electrode 18 is not limited to Al but other conductive materials may be used as well. As the lower substrate 11 is fabricated in the above-described manner and is made to face, via a frame member, the opposite substrate 12 on which the color filter 26 and the transparent electrode 25 are deposited, and the liquid crystal layer 13 is injected between both substrates to thereby manufacture the liquid crystal display. As that surface of the lower substrate 11 which contacts the liquid crystal layer 13 can be made substantially planarized, the alignment disturbance or the like of the liquid crystal layer 13 does not occur in the vicinity of the boundary between the transparent area and the reflection area.

As the openings 31 are formed in the reflection electrode 18, light is allowed to pass through the liquid crystal layer 13 to ensure liquid crystal display by irradiating the light from the opposite side of the lower substrate 11 to the liquid crystal layer 13 by means of a backlight or the like in transmission mode, so that display can be ensure even under a dark environment. The regions where the openings 31 are formed cannot reflect input light from the opposite substrate 12 toward a viewer, so that the luminance is not significantly reduced even in the reflection mode that reflects the input light from the opposite substrate 12 at the reflection electrode 18 for liquid crystal display.

A description will now be given of a liquid crystal display in which the insulating layer 17 deposited on the TFTs 16 on the lower substrate 11 is replaced with the color filter 26 as a different embodiment. The partial cross-sectional view of the semi-transmission type liquid crystal display and the process of forming the reflection electrode in the fabrication process of the semi-transmission type liquid crystal display are the same as those of the first to fourth embodiments. The difference lies only in the replacement of the insulating layer 17 with the color filter 26.

In the display of the reflection mode, input light from the opposite substrate 12 passes the color filter 26 provided on the opposite substrate 12 twice until it becomes output light, In the display of the transmission mode, the light from the backlight 28 passes the color filter 26 provided on the lower substrate 11 and the color filter 26 provided on the opposite substrate 12 until it becomes output light. In reflection and transmission modes, the light passes a color filter twice, making it possible to ensure the same color display in both modes. It is also possible to determine the balance of colors displayed independently between the transmission mode and reflection mode.

According to the invention, as the drive voltage applied to the liquid crystal layer in the transparent area is lower than the drive voltage applied to the liquid crystal layer in the reflection area, the birefringence of the liquid crystal layer in the reflection area becomes smaller than the birefringence of the liquid crystal layer in the transparent area, making it possible to ensure the optimal birefringence in each of the reflection mode and transmission mode. This can optimize the intensities of the output light in both modes. The capacitive division produces a difference between the drive voltages of the transparent area and reflection area, so that the transparent area and reflection area can be simultaneously driven by the voltage that is supplied by a single thin film transistor. This makes it possible to prevent an increase in the quantity of the thin film transistors and eliminate the complexity of the drive voltage control, leading to a reduction in the production cost of the liquid crystal display. As the cell gaps in the transparent area and the reflection area are substantially identical, it is possible to eliminate an alignment disturbance produced by the disturbance of the electric line of force in the liquid crystal layer or an alignment disturbance, such as the reverse tilt disclination produced by the disturbance of the pretilt angle. This can improve the characteristics of the liquid crystal display.

As the reflection electrode is connected to the transparent electrode via the insulating film, the insulating film is deposited on the reflection electrode, the insulating film is deposited on that area of the opposite substrate which faces the reflection electrode, the insulating film is deposited on the reflection electrode and that area of the opposite substrate which faces the reflection electrode, the second source electrode is connected to the source electrode via the insulating film, or the insulating film is deposited on the transparent electrode and the reflection electrode is formed on the insulating film, a capacitor is formed by the reflection electrode and the transparent electrode and a potential difference can be provided between the transparent area and the reflection area by capacitive division. Because the reflection electrode and insulating film are eliminated at the opening, the opening serves as the transparent area.

It is difficult to efficiently reflect light input from the opposite substrate toward a viewer in the top peripheral regions and the bottom peripheral regions of the undulations. Therefore, the openings are formed in the top peripheral regions and the bottom peripheral regions as transparent areas, so that efficient liquid crystal display can be ensured in reflection mode as well as transmission mode.

Because SiN, $SiO_2$, $Ti_2O_3$, $Ta_2O_5$, SiO, $Al_2O_5$, acryl and arton can be used as the material for the insulating film, it is possible to select the optimal insulating film in accordance with various conditions, such as the usage, the product quality and the material for the liquid crystal. This increases the degree of freedom in the design stage.

As the color filters are formed on the opposite substrate and the device substrate, light passes the color filter on the opposite substrate side twice in reflection mode and light passes the color filters on the device substrate and the opposite substrate once each in transmission mode. This can make it possible to reduce a change in color in both modes. It is also possible to respectively set the hues in transmission mode and reflection mode.

What is claimed is:

1. A liquid crystal display comprising:
   a lower substrate on which interconnections and thin film transistors are formed;
   an opposite substrate so arranged as to face said lower substrate;
   a liquid crystal layer sandwiched between said lower substrate and said opposite substrate;
   a reflection electrode formed in a reflection area of said lower substrate;
   a transparent electrode formed in a transparent area of said lower substrate;
   a common electrode formed on said opposite substrate; and
   a drive circuit for applying a voltage between said reflection electrode and said common electrode and between said transparent electrode and said common electrode,
   whereby a potential difference between a drive voltage applied to that surface of said lower substrate which contacts said liquid crystal layer and a drive voltage applied to that surface of said opposite substrate which contacts said liquid crystal layer is made lower in said reflection area than in said transparent area through capacitive division of the voltage applied by said drive circuit.

2. A liquid crystal display comprising:
   a lower substrate on which interconnections and thin film transistors are formed;
   an opposite substrate so arranged as to face said lower substrate;
   a liquid crystal layer sandwiched between said lower substrate and said opposite substrate;
   a reflection electrode formed in a reflection area of said lower substrate;
   a transparent electrode formed in a transparent area of said lower substrate;
   a common electrode formed in said opposite substrate; and
   a drive circuit for applying a voltage between said reflection electrode and said common electrode and between said transparent electrode and said common electrode,
   wherein a potential difference between a drive voltage applied to that surface of said lower substrate which contacts said liquid crystal layer and a drive voltage applied to that surface of said opposite substrate which contacts said liquid crystal layer is made lower in said reflection area than in said transparent area, and
   wherein a cell gap which is a thickness of a liquid crystal layer in said transparent area is substantially equal to a cell gap which is a thickness of a liquid crystal layer in said reflection area.

3. The liquid crystal display according to claim 2, wherein said potential difference between said drive voltage applied to that surface of said lower substrate which contacts said liquid crystal layer and said drive voltage applied to that surface of said opposite substrate which contacts said liquid crystal layer is made lower in said reflection area than in said transparent area by capacitive division of an output of said drive circuit to form said potential difference in said reflection area and said potential difference in said transparent area.

4. A liquid crystal display comprising:
   a lower substrate on which interconnections and thin film transistors are formed;
   an opposite substrate so arranged as to face said lower substrate;
   a liquid crystal layer sandwiched between said lower substrate and said opposite substrate;
   a reflection electrode formed in a reflection area of said lower substrate;
   a first transparent electrode formed in a transparent area of said lower substrate;
   a common electrode formed on said opposite substrate; and
   a drive circuit for applying a voltage between said reflection electrode and said common electrode and between said transparent electrode and said common electrode,
   wherein a potential difference between that surface of said lower substrate which contacts said liquid crystal layer and a drive voltage applied to that surface of said opposite substrate which contacts said liquid crystal layer is made lower in said reflection area than in said transparent area, and
   wherein an insulating layer is deposited on said thin film transistors, said reflection electrode and said transparent electrode are formed on said insulating layer at separate predetermined regions, and said transparent electrode is electrically connected to a source electrode of a respective one of said thin film transistors via a contact hole formed in said insulating layer, and said reflective electrode is connected to said transparent electrode via an insulating film thereby capacitively dividing said voltage applied by said drive circuit to apply a lower voltage to said reflection electrode than to said transparent electrode.

5. The liquid crystal display according to claim 4, wherein said insulating film is formed of one selected from SiN, $SiO_2$, $Ti_2O_3$, $Ta_2O_5$, SiO, $Al_2O_3$, acryl and arton.

6. A liquid crystal display comprising:
   a first substrate in or on which interconnections and thin film transistors are formed;
   an second opposing substrate opposite from the first substrate in or on which is formed a common electrode;
   a liquid crystal layer between the first substrate and the second substrate;
   a reflection electrode formed in a reflection area in or one the first substrate;
   a transparent electrode formed in a transparent area in or on the first substrate; and
   a drive circuit for applying a voltage between the reflection electrode and the common electrode and between the transparent electrode and the common electrode,
   whereby the voltages applied to the transparent electrode and to the reflection electrode are different due to a capacitive connection of the reflection electrode to the drive circuit through the transparent electrode and an insulating film intermediate the transparent electrode and the reflective electrode.

7. The liquid crystal display of claim 6 wherein the voltage applied to the reflection electrode is lower than the voltage applied to the transparent electrode.

8. The liquid crystal display of claim 7 wherein the gap between the transparent electrode and the common electrode and between the reflection electrode and the common electrode being such that the path length of light passing through the liquid crystal layer in the reflection area is substantially greater than that of the light passing between the transparent electrode and the common electrode in the transparent area.

9. The liquid crystal display of claim 8 wherein the path length of the light passing through the liquid crystal layer in the reflection area being approximately twice that of the path length of the light passing through the liquid crystal layer in the transparent area.

10. A liquid crystal display comprising:
a first substrate in or on which interconnections and thin film transistors are formed;
a second opposing substrate opposite from the first substrate in or on which is formed a common electrode;
a liquid crystal layer between the first substrate and the second substrate;
a reflection electrode formed in a reflection area of the first substrate;
a transparent electrode formed in a transparent area of the first substrate;
wherein the gap defined by the thickness of the liquid crystal layer in the reflection area and in the transparent area is substantially the same, such that the path length of light making two passages through the liquid crystal layer in the reflection area is substantially twice that of the path length of light making a single passage through the liquid crystal layer in the transparent area; and
a drive circuit for applying a voltage between the reflection electrode and the common electrode and between the transparent electrode and the common electrode from a single terminal in the drive circuit,
whereby the voltage applied between the transparent electrode and the common electrode is different than the voltage applied between the reflection electrode and the common electrode due to a capacitive connection of the reflection electrode to the single terminal of the drive circuit.

11. The liquid crystal display of claim 10 wherein the capacitive connection of the reflection electrode to the single terminal of the drive circuit is through the transparent electrode, the capacitive connection formed by an insulating film intermediate the transparent electrode and the reflective electrode.

12. The liquid crystal display of claim 11 wherein the gap between the transparent electrode and the common electrode and between the reflection electrode and the common electrode being such that the path length of light passing through the liquid crystal layer in the reflection area is substantially greater than that of the light passing between the transparent electrode and the common electrode in the transparent area.

13. The liquid crystal display of claim 12 wherein the path length of the light passing through the liquid crystal layer in the reflection area being approximately twice that of the path length of the light passing through the liquid crystal layer in the transparent area.

14. The liquid crystal display of claim 10 wherein the voltage applied to the reflection electrode is lower than the voltage applied to the transparent electrode.

15. The liquid crystal display of claim 10 wherein the gap between the transparent electrode and the common electrode and between the reflection electrode and the common electrode being such that the path length of light passing through the liquid crystal layer in the reflection area is substantially greater than that of the light passing between the transparent electrode and the common electrode in the transparent area.

16. The liquid crystal display of claim 15 wherein the path length of the light passing through the liquid crystal layer in the reflection area being approximately twice that of the path length of the light passing through the liquid crystal layer in the transparent area.

17. A method of operating a liquid crystal display element of the semi-transmission type comprising:
providing a reflection area associated with a pixel element of the liquid crystal display associated with a reflection electrode;
providing a transparent area of the pixel element of the liquid crystal display associated with a transparent electrode;
providing a liquid crystal layer gap in the reflection area that is substantially equal to a liquid crystal layer gap in the transparent area;
utilizing a single switching element having an applied voltage terminal, applying a different drive voltage to the transparent electrode than to the reflection electrode by capacitive division of the voltage applied to the transparent electrode and to the reflection electrode.

18. The method of claim 17 further comprising:
applying a lower voltage to the reflection electrode than to the transparent electrode.

19. The method of claim 17 further comprising:
capacitively dividing the voltage applied to the transparent electrode and the reflective electrode by providing a capacitive connection of the reflective electrode to the applied voltage terminal.

20. The method of claim 19 further comprising:
providing the capacitive connection of the reflective electrode to the applied voltage terminal through the transparent electrode.

\* \* \* \* \*